United States Patent [19]
Pacheco, Sr.

[11] Patent Number: 5,689,174
[45] Date of Patent: Nov. 18, 1997

[54] ELECTRICAL POWER SYSTEM

[76] Inventor: Angel Luis Pacheco, Sr., 1221 Pinetree Dr., Indian Harbour Beach, Fla. 32937

[21] Appl. No.: 675,431

[22] Filed: Jun. 27, 1996

Related U.S. Application Data

[63] Continuation-in-part of Ser. No. 106,354, Aug. 13, 1993, abandoned.

[51] Int. Cl.$^6$ ........................................ H02J 7/00
[52] U.S. Cl. ........................ 322/16; 320/14; 290/47; 290/4 C
[58] Field of Search ........................ 290/2, 4 R, 4 A, 290/40 A, 40 C; 322/1, 4, 14

[56] References Cited

U.S. PATENT DOCUMENTS

| | | | |
|---|---|---|---|
| Re. 31,156 | 2/1983 | Dessert | 180/2 A |
| 1,275,201 | 8/1918 | Beach . | |
| 2,813,984 | 11/1957 | Dolecki et al. | 290/10 |
| 3,719,881 | 3/1973 | Shibata et al. | 320/62 |
| 4,042,056 | 8/1977 | Horwinski | 180/65 A |
| 4,438,342 | 3/1984 | Kenyon | 290/45 |
| 4,470,476 | 9/1984 | Hunt | 180/65.2 |
| 4,604,565 | 8/1986 | Yokota et al. | 320/15 |
| 4,951,769 | 8/1990 | Kawamura | 180/65.4 |
| 5,497,070 | 3/1996 | Furutani et al. | 322/23 |

*Primary Examiner*—Steven L. Stephan
*Assistant Examiner*—Nicholas Ponomarenko

[57] ABSTRACT

An electrical power plant has a rotator means (1) that rotates one or more alternators (6, 8) to generate electrical current that is transmitted to one or more electrical storage bakeries (12, 13) from which electrical current is transmitted to an electrical motor (2) that is a rotational-power component of the rotator means. Electrical current can be transmitted from the one-or-more storage batteries to electrical items such as a vehicle motor (32, 34), electrical appliances, electric lights and electrical communication devices. The rotator means can include a prime mover (10) that can be used for particular applications such as a vehicle (30) engine in addition to rotation of one or more of the alternators.

23 Claims, 3 Drawing Sheets

ELECTRICAL POWER SYSTEM

This is a continuation-in-part of U.S. patent application Ser. No. 08/106,354 having a filing date of Aug. 13, 1993, now abandoned.

BACKGROUND OF THE INVENTION

1. Field of the Invention

This invention relates to generation, storage and supply of electricity for portable generator sets, propulsion power for vehicles, electrical power for space vehicles, and for stationary power plants.

2. Description of Related Art

Previous electrical power plants using rotational generators have supplied current directly from the generators or have stored electrical energy in batteries for later supply. It has been found, however, that in addition to charging a battery with an alternator rotated by a prime mover, extent of electrical power available from the battery can be increased by generation of electricity with one or more alternators rotated by an electrical motor powered by current from the battery to rotate the alternator to charge the battery. An alternator can be utilized to generate electricity by rotation with an electrical motor powered by current from the battery. It has been found further that, independently of charging the battery with an alternator rotated by a prime mover, extent of electrical power available from the battery can be increased by generation of electricity with one or more alternators rotated by an electrical motor powered by current from the battery to rotate the alternator to charge the battery.

SUMMARY OF THE INVENTION

In light of a vast need for improvement in electrical power generation and storage for its later use, objects of this invention are to provide an electrical power plant which can be used to power vehicles and other electrical items with longer duration of electrical-battery power in proportion to electrical charge of a battery by a prime mover. Another problem with engine-electrical systems such as an electrical car, mostly with hybrid types but also with straight electrical types, is providing start-up power and acceleration power without waste of prime-mover cost and fuel cost.

This invention accomplishes these and other objectives with an electrical power plant having a rotator means that rotates one or more alternators to generate electrical current that is transmitted to one or more electrical storage batteries from which electrical current is transmitted to an electrical motor that is a rotational-power component of the rotator means. Electrical current can be transmitted from the one-or-more storage batteries to electrical items such as a vehicle motor, electrical appliances, electric lights and electrical communication devices. The rotator means can include a prime mover that can be used for particular applications such as a vehicle engine in addition to rotation of one or more of the alternators.

BRIEF DESCRIPTION OF DRAWINGS

This invention is described by appended claims in relation to description of a preferred embodiment with reference to the following drawings which are described briefly as follows:

DESCRIPTION OF PREFERRED EMBODIMENT

Figure 1:
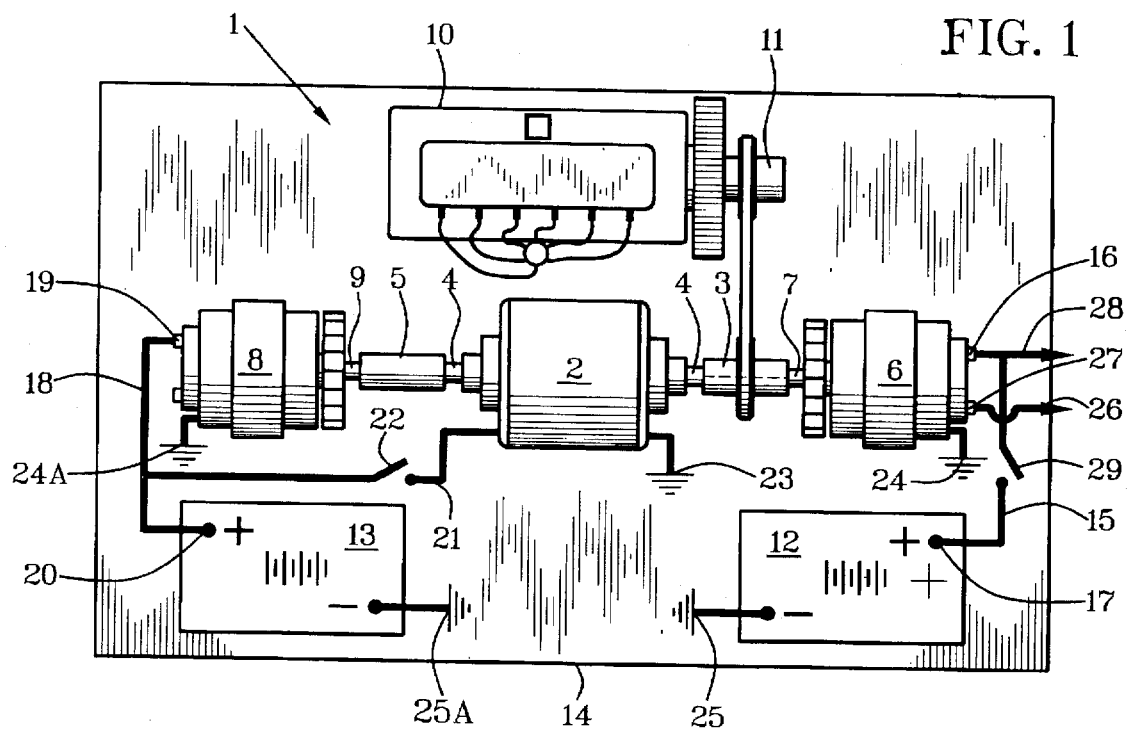
FIG. 1 is a plan view of a dual-generator embodiment.

Reference is made first to FIG. 1. A rotator means 1 has an electrical motor 2 as a rotational-power component. The electrical motor 2 has a first rotator shaft 3 extended from a first end of a motor shaft 4 and a second rotator shaft 5 extended from a second end of the motor shaft 4. A first alternator 6 has a first-alternator rotor shaft 7 to which the first rotator shaft 3 is connected. A second alternator 8 has a second-alternator rotor shaft 9 to which the second rotator shaft 5 is connected.

The rotator means 1 has a prime mover 10 with a drive shaft 11 in rotational contact with the first rotator shaft 3. Rotational contact can be with a pulley drive as depicted or with a belt drive or gears. Rotation of the drive shaft 11 of the prime mover 10 rotates both the first alternator 6 and the second alternator 8 through a single motor shaft 4 to which the first rotator shaft 3 and the second rotator shaft 5 are connected.

A first electrical storage battery 12 is charged by current from the first alternator 6 and a second electrical storage battery 13 is charged by current from the second alternator 8. A common frame 14 is positioned in proximity to the first electrical storage battery 12, the second electrical storage battery 13, the first alternator 6, the second alternator 8 and the electrical motor 2. Other components also can be positioned in proximity to or on the common frame 14. Frame-grounding of electrical components is a primary function of the common frame 14.

A first-alternator power line 15 is in electrical communication between a DC (direct current) output pole 16 of the first alternator 6 and a first positive pole 17 of the first electrical storage battery 12. A second-alternator power line 18 is in electrical communication between an output pole 19 of the second alternator 8 and a second positive pole 20 of the second electrical storage battery 13.

A motor power line 21 is in electrical communication between the second-alternator power line 18 and the electrical motor 2. A motor switch 22 in the motor power line 21 can be an on-off switch or a regulator switch in addition to an on-off switch.

Frame grounds attached to the common frame 14 are provided for the electrical items. Included are a motor ground 23 on the electrical motor 2; an alternator ground 24 on the first alternator 6 and the second alternator 8; and a battery ground 25 on the first electrical storage battery 12 and the second electrical storage battery 13.

The first alternator 6 can be regulative between output of alternating current through an alternating-current line 26 from an alternating-current pole 27 and output of direct current through a direct-current line 28 from the direct-current-output pole 16. A circuit breaker 29 can be positioned in the first-alternator power line 15 for separate use of direct current through the direct-current line 28.

Figure 2:
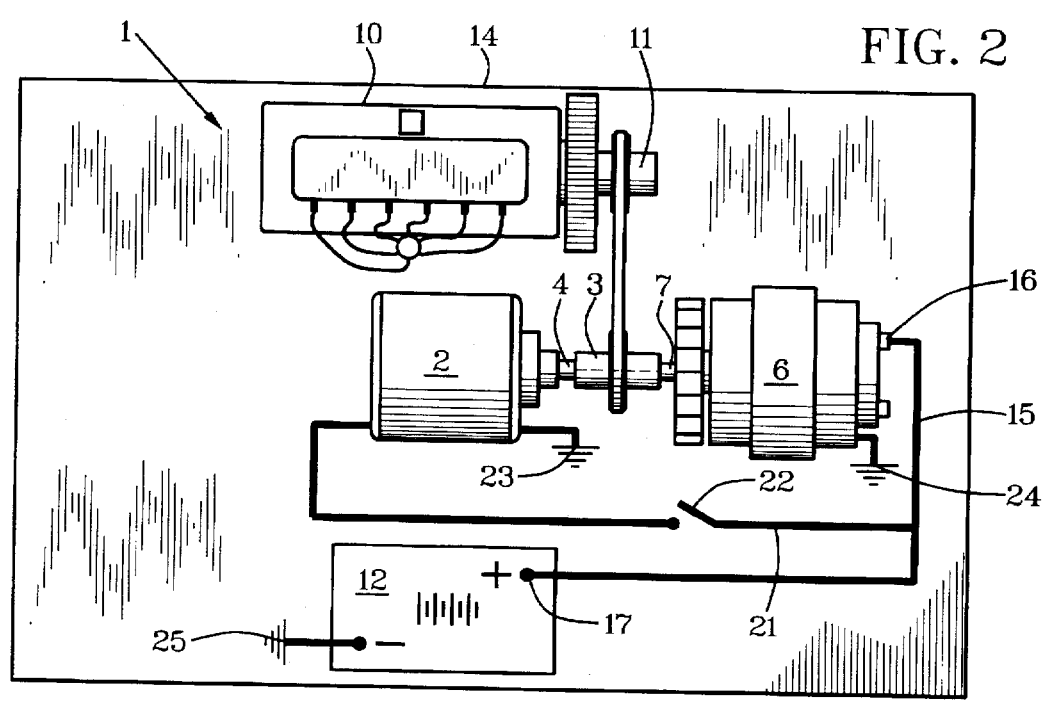
FIG. 2 is a plan view of a single-generator embodiment.

Referring to FIG. 2, the first rotator shaft 3 can be connected to the first-alternator rotor shaft 7 of the first alternator 6 singly. The first alternator 6 can be relatively larger than for use of more than one alternator with a single motor 2 and a prime mover 10. For use of the first alternator 6 singly, motor power line 21 can be connected to the first-alternator power line 15 as shown or alternatively connected to the first positive pole 17.

Figure 3:
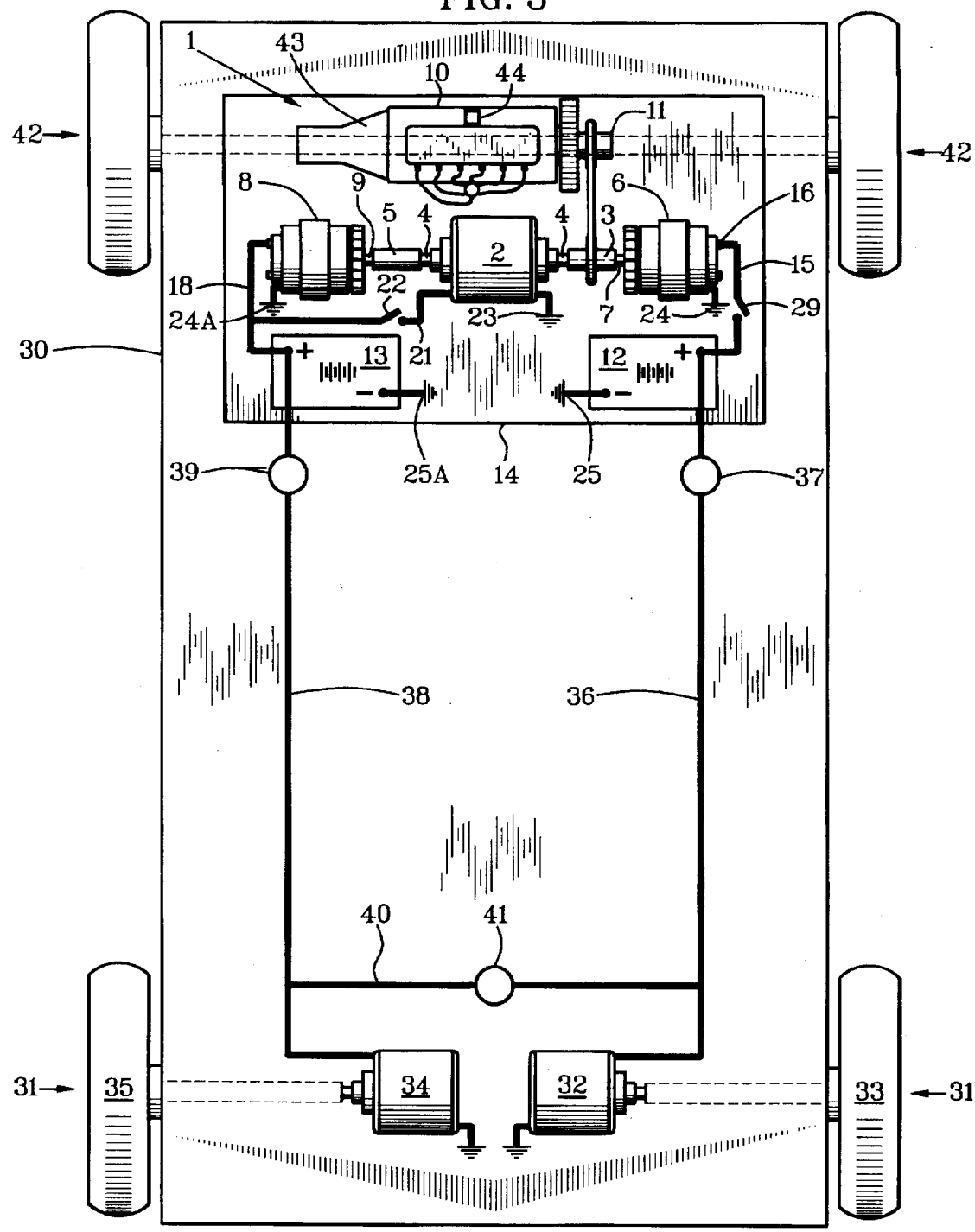
FIG. 3 is a plan view of a dual-generator embodiment as a power system for a vehicle.

Referring to FIG. 3, the electrical power plant can be positioned on a vehicle 30 having at least one vehicle motor to which electrical current is transmitted for providing rotative power to a first set of wheels 31 for the vehicle 30. Preferably, a first vehicle motor 32 is employed to power a first wheel 33 and a second vehicle motor 34 is employed to power a second vehicle wheel 35 of the first set of wheels 31.

A first motor line 36 from a first electrical storage battery 12 to the first vehicle motor 32 can have a first regulator switch 37 and a second motor line 38 from a second electrical storage battery 13 can have a second regulator switch 39. A differential line 40 also can be provided between the first motor line 36 and the second motor line 38. In addition to on-off switching and power-level regulation, the first regulator switch 37 and the second regulator switch 39 can provide proportional power for differences of wheel speed and power for turning and for adjustment to viscosity of road conditions. A differential regulator switch 41 in the differential line 40 can be used primarily for adjustment of power requirements for the first wheel 33 and the second wheel 35 due to road and driving conditions.

A second set of wheels 42 can be powered by the prime mover 10 through a vehicle transmission 43. Conventional technology can be employed for transmitting rotational power from the vehicle transmission 43 to the second set of wheels 42. A power regulator such as a carburetor 44 for the prime mover 10 can be employed in combination with the first regulator switch 37 and the second regulator switch 39 to select desired levels of prime-mover power for the second set of wheels 42 and electrical power for the first set of wheels 31.

This gives a wide selection of power for a form of hybrid electrical car. It can use electrical power for moderate power requirements and for use where decrease of smog is desired, but can have prime-mover power or both prime-mover power and electrical power when needed.

Figure 4:
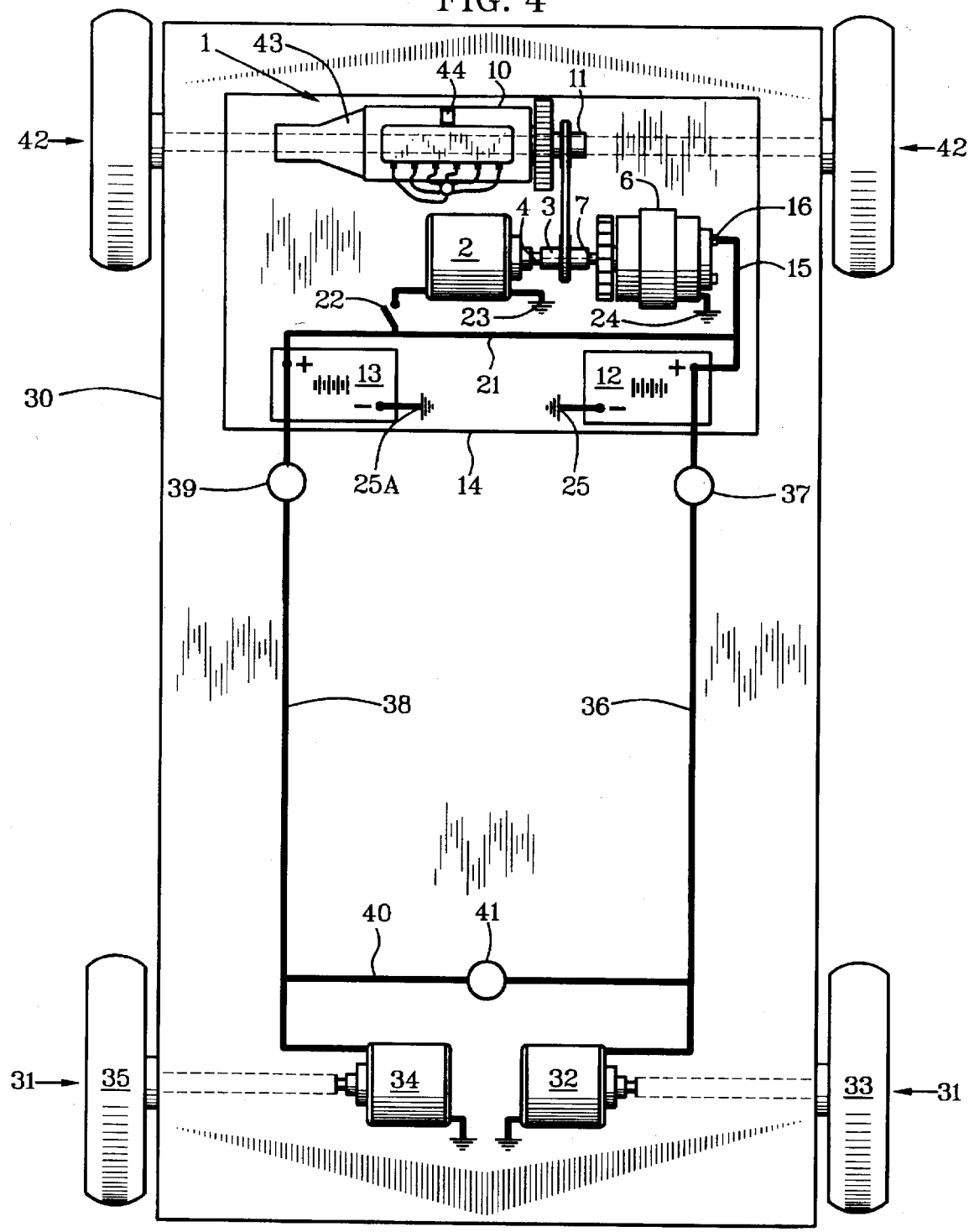
FIG. 4 is a plan view of a single-generator embodiment as a power system for a vehicle.

For the FIG. 4 embodiment, the vehicle features are the same as described in relation to FIG. 3 and the generator features are the same as described in relation to FIG. 2.

A new and useful electrical power plant having been described, all such modifications, adaptations, substitutions of equivalents, combinations of parts, pluralities of parts, applications and forms thereof as described by the following claims are included in this invention.

What is claimed is:

1. An electrical power plant comprising:
    a rotator means having an electrical motor as a rotational-power component;
    a first rotator shaft extended from a first end of a motor shaft of the electrical motor;
    a first alternator having a first-alternator rotor shaft;
    the first rotator shaft being connected to the first-alternator rotor shaft;
    a first electrical storage battery;
    a first-alternator power line in electrical communication between an output pole of the first alternator and a positive pole on the first electrical storage battery;
    a second rotator shaft extended from a second end of a motor shaft of the electrical motor;
    a second alternator having a second-alternator rotor shaft;
    the second rotator shaft being connected to the second-alternator rotor shaft;
    a second electrical storage battery;
    a second-alternator power line in electrical communication between an output pole of the second alternator and a positive pole on the second electrical storage battery; and
    a motor power line in electrical communication between the second-alternator power line and the electrical motor.

2. An electrical power plant as described in claim 1 and further comprising:
    a common frame on which the electrical motor, the first alternator, the second alternator, the first electrical storage battery and the second electrical storage battery are positioned.

3. An electrical power plant as described in claim 2 and further comprising:
    a motor ground on the electrical motor in electrical communication with the common frame;
    an alternator ground on the first alternator in electrical communication with the common frame;
    an alternator ground on the second alternator in electrical communication with the common frame;
    a battery ground on the first electrical storage battery in electrical communication with the common frame; and
    a battery ground on the second electrical storage battery in electrical communication with the common frame.

4. An electrical power plant as described in claim 3 and further comprising:
    a motor switch in the motor power line.

5. An electrical power plant as described in claim 1 wherein:
    the rotator means has a prime mover with a drive shaft in rotational contact with the first rotator shaft of the rotator means.

6. An electrical power plant as described in claim 5 and further comprising:
    a common frame on which the electrical motor, the first alternator, the second alternator, the first electrical storage battery and the second electrical storage battery are positioned;
    a motor ground on the electrical motor in electrical communication with the common frame;
    an alternator ground on the alternator in electrical communication with the common frame; and
    a battery ground on the electrical storage battery in electrical communication with the common frame.

7. An electrical power plant as described in claim 5 and further comprising: a motor switch in the motor power line.

8. An electrical power plant as described in claim 7 wherein:
    the first alternator is regulative between output of alternating current through an alternating-current line from an alternating-current pole and output of direct current through a direct-current line from a direct-current pole; and
    a circuit-breaker is positioned in the first-alternator power line.

9. An electrical power plant as described in claim 7 wherein:
    the prime mover is a vehicle engine having selective output of power to a vehicle on which the electrical power plant is positioned; and
    the vehicle has at least one electrical motor to which electrical current is transmitted selectively from the first electrical storage battery and the second electrical storage battery.

10. An electrical power plant as described in claim 9 wherein:
    the vehicle has a first electrical motor that is drive-coupled to a first wheel of a first set of wheels of the vehicle;

the first electrical motor has selective output power to the first wheel of the first set of wheels of the vehicle;

the vehicle has a second electrical motor that is drive-coupled to a second wheel of the first set of wheels of the vehicle;

the second electrical motor has selective output power to the second wheel of the first set of wheels of the vehicle;

the vehicle engine is drive-coupled to a second set of wheels of the vehicle; and the vehicle engine has selective output power to first and second wheels of the second set of wheels of the vehicle.

11. An electrical power plant as described in claim 1 wherein:

the electrical power plant is positioned on a vehicle having a vehicle motor to which electrical current is transmitted selectively from the first electrical storage battery and the second electrical storage battery.

12. An electrical power plant comprising:

a rotator means having an electrical motor as a rotational-power component;

a rotator shaft extended from the electrical motor;

at least one alternator having a rotor shaft;

the rotator shaft being connected to the rotor shaft;

at least one electrical storage battery;

an alternator power line in electrical communication between an output pole of the alternator and a positive pole on the electrical storage battery; and a motor power line in electrical communication between the alternator power line and the electrical motor.

13. An electrical power plant as described in claim 12 and further comprising:

a common frame on which the electrical motor, the alternator and the electrical storage battery are positioned.

14. An electrical power plant as described in claim 13 and further comprising:

a motor ground on the electrical motor in electrical communication with the common frame;

an alternator ground on the alternator in electrical communication with the common frame; and a battery ground on the electrical storage battery in electrical communication with the common frame.

15. An electrical power plant as described in claim 14 and further comprising:

a motor switch in the motor power line.

16. An electrical power plant as described in claim 12 and further comprising:

a motor switch in the motor power line.

17. An electrical power plant as described in claim 12 wherein:

the rotator means has a prime mover with a drive shaft in rotational contact with the rotator shaft of the rotator means.

18. An electrical power plant as described in claim 17 and further comprising:

a common frame on which the electrical motor, the alternator and the electrical storage battery are positioned.

19. An electrical power plant as described in claim 18 and further comprising:

a motor ground on the electrical motor in electrical communication with the common frame;

an alternator ground on the alternator in electrical communication with the common frame;

a battery ground on the electrical storage battery in electrical communication with the common frame; and a motor switch in the motor power line.

20. An electrical power plant as described in claim 19 wherein:

the electrical power plant is positioned on a vehicle having a vehicle motor to which electrical current is transmitted selectively from the electrical storage battery.

21. An electrical power plant as described in claim 12 wherein:

the rotator means has a prime mover with a drive shaft that is drive-coupled to the rotor shaft; and the prime mover has selective output of power and speed of the drive shaft.

22. An electrical power plant as described in claim 21 wherein:

the prime mover is a vehicle engine having selective output of power to a vehicle on which the electrical power plant is positioned;

the vehicle has a first electrical motor that is drive-coupled to a first wheel of a first set of wheels of the vehicle;

the first electrical motor has selective output power to the first wheel of the first set of wheels of the vehicle;

the vehicle has a second electrical motor that is drive-coupled to a second wheel of the first set of wheels of the vehicle;

the second electrical motor has selective output power to the second wheel of the first set of wheels of the vehicle;

the vehicle engine is drive-coupled to a second set of wheels of the vehicle; and the vehicle engine has selective output power to first and second wheels of the second set of wheels of the vehicle.

23. An electrical power plant as described in claim 12 wherein:

the electrical power plant is positioned on a vehicle having a vehicle motor to which electrical current is transmitted selectively from the electrical storage battery.

* * * * *